(12) United States Patent
Yamane

(10) Patent No.: US 6,763,481 B2
(45) Date of Patent: Jul. 13, 2004

(54) DATA PROCESSOR

(75) Inventor: Ichiro Yamane, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 566 days.

(21) Appl. No.: 09/833,214

(22) Filed: Apr. 12, 2001

(65) Prior Publication Data

US 2002/0016934 A1 Feb. 7, 2002

(30) Foreign Application Priority Data

Apr. 12, 2000  (JP) ........................................ 2000-110103

(51) Int. Cl.⁷ .............................................. G06F 11/00
(52) U.S. Cl. ........................ 714/11; 714/704; 714/708; 714/797
(58) Field of Search ............................ 714/820, 43, 11, 714/774, 708, 797, 704, 750, 819, 37

(56) References Cited

U.S. PATENT DOCUMENTS

| | | | | |
|---|---|---|---|---|
| 5,822,329 A | * | 10/1998 | Nakajima et al. | 714/700 |
| 5,978,959 A | * | 11/1999 | Hekstra et al. | 714/821 |
| 6,058,491 A | * | 5/2000 | Bossen et al. | 714/15 |
| 6,173,414 B1 | * | 1/2001 | Zumkehr et al. | 714/6 |
| 6,286,125 B1 | * | 9/2001 | Leshay et al. | 714/807 |
| 6,330,701 B1 | * | 12/2001 | Rosendahl et al. | 714/757 |
| 6,480,974 B1 | * | 11/2002 | Porterfield | 714/43 |
| 6,496,911 B1 | * | 12/2002 | Dixon et al. | 711/170 |
| 2001/0018752 A1 | * | 8/2001 | Yoshioka et al. | 714/47 |

FOREIGN PATENT DOCUMENTS

| | | |
|---|---|---|
| JP | 4-23049 A | 1/1992 |
| JP | 4-362757 A | 12/1992 |
| JP | 5-224968 A | 9/1993 |
| JP | 6-4421 A | 1/1994 |

* cited by examiner

Primary Examiner—Robert Beausoliel
Assistant Examiner—Marc M Duncan
(74) Attorney, Agent, or Firm—McDermott, Will & Emery

(57) ABSTRACT

A data processor includes first and second devices that are coupled together via a signal path. The first device includes a first arithmetic unit. The first arithmetic unit performs an arithmetic operation on data to obtain a first result during an operation cycle, in which the first device transfers the data to the second device through the signal path. The first arithmetic unit outputs the first result onto the signal path during an idle cycle in which no data is transferred through the signal path. The second device includes second arithmetic unit and comparator. The second arithmetic unit performs the same type of arithmetic operation on the data, transferred through the signal path in the operation cycle, to obtain a second result. The comparator compares the first result, transferred through the signal path in the idle cycle, to the second result and outputs a comparison result.

10 Claims, 6 Drawing Sheets

DATA PROCESSOR

BACKGROUND OF THE INVENTION

The present invention relates to a data processor for detecting an error that has been produced in data being transferred.

Recently, microcontrollers for use in various types of controls have their size or operating voltage reduced considerably, and have their immunity against extraneous noise decreased correspondingly. So as is more and more often the case with microcontrollers of today, extraneously incoming noise partially alters data transferred, thereby causing a system runaway. Under the circumstances such as these, first of all, microcontrollers should have their noise immunity improved. But it is no less important to minimize the damage potentially done on the system by the noise-induced runaway so that the system can resume running normally as quickly as possible.

Hereinafter, it will be described with reference to FIG. 12 how a known data processor operates. FIG. 12 is a block diagram illustrating an arrangement for a known data processor.

As shown in FIG. 12, the processor includes microcontroller 130, memories 110 and 120 and data buses 31, 32 and 33. The memories 110 and 120 and microcontroller 130 are connected to the data buses 31, 32 and 33, respectively. The data buses 31 and 32 are coupled together via a bus switch 34, while the data buses 32 and 33 are coupled together via a bus switch 35.

Suppose the microcontroller 130 is now reading a program from the memory 110 and, executing it, and the program stored on the memory 110 is represented by data "55h", where h indicates that this is a hexadecimal representation. In that case, the data is transferred from the memory 110 to the microcontroller 130 by way of the buses 31, 32 and 33. On receiving the data, the microcontroller 130 decodes it to execute the program.

For example, assume the data "55h" is affected by extraneous noise and changes into "54h" while transferred through the bus 32. Even so, the microcontroller 130 also decodes the erroneous data "54h" as usual to execute the program just as decoded. In that case, the microcontroller 130 will not operate as originally intended by the program.

In a data processor like this, even if data is affected by noise and subjected to unwanted change while being transferred, the device on the receiving end will continue to operate erroneously, because the receiver has no means for detecting the unintentional data change. For example, where a microcontroller should receive data representing a program, the unwanted data change will force the microcontroller to execute the erroneous program continuously against the original purpose. As a result, the data processor adversely causes a runaway or is hung up unintentionally.

SUMMARY OF THE INVENTION

An object of this invention is providing a data processor that detects any change caused by extraneous noise in data being transferred through a signal path, like a data bus, and thereby resumes running normally even if the processor once operated erroneously due to the data change.

Specifically, a first inventive data processor includes first and second devices that are coupled together via a signal path. The first device includes a first arithmetic unit. The first arithmetic unit performs an arithmetic operation on data to obtain a first result during an operation cycle in which the first device transfers the data to the second device through the signal path. The first arithmetic unit outputs the first result onto the signal path during an idle cycle in which no data is transferred through the signal path. The second device includes a second arithmetic unit and a comparator. The second arithmetic unit performs the same type of arithmetic operation on the data, transferred through the signal path in the operation cycle, to obtain a second result. And the comparator compares the first result, transferred through the signal path in the idle cycle, to the second result and outputs a comparison result.

The first inventive processor performs an arithmetic operation based on the value of data on a signal path in an operation cycle, and transfers a result of the operation to the second device and compares the result to another operation result in an idle cycle. Accordingly, a data change caused by extraneous noise can be detected without taking any time for error detection.

In one embodiment of the present invention, if the comparison result indicates inequality between the first and second results, the comparator may initialize the second device by performing interrupt or reset processing. In such an embodiment, if the first and second results compared do not agree with each other, then the second device is initialized by supplying an interrupt or reset signal thereto. Accordingly, even if the second device has caused a runaway due to extraneous noise, the second device can soon resume running normally. Where the second device is a microcontroller, for example, an erroneous program can be aborted and an intended program can be executed correctly.

In another embodiment of the present invention, the inventive processor may further include a controller. The controller may count the number of times of inequality between the first and second results. The controller may output an interrupt signal to the second device if the number is equal to or smaller than a predetermined number or a reset signal to the second device if the number is greater than the predetermined number. In such an embodiment, if the comparison results indicate inequality a relatively small number of times, then the second device can be initialized by means of software, or by executing interrupt-driven processing. On the other hand, if the comparison results indicate inequality a relatively large number of times, then the hardware, or the second device, can be reset and initialized compulsorily. In this manner, the second device can be adaptively rebooted in accordance with the situation.

In still another embodiment, the inventive processor may further include a frequency divider. The frequency divider may supply a signal, a frequency of which is a submultiple of a clock frequency, to the second device and decrease the frequency of the signal if the comparison result indicates inequality between the first and second results. In such an embodiment, the level of the noise generated inside the second device can be lowered gradually by decreasing the operating speed of the second device.

In yet another embodiment, the first device may be a memory device and the second device may be a microcontroller. In such an embodiment, any change caused by extraneous noise in data being transferred from the memory device to the microcontroller can be detected.

A second inventive data processor includes first and second devices that are coupled together via a signal path. The first device includes a first arithmetic unit and a comparator. The first arithmetic unit performs an arithmetic operation on data to obtain a first result during an operation cycle in which the first device transfers the data to the second device through the signal path. The second device includes a second arithmetic unit. The second arithmetic unit performs the same type of arithmetic operation on the data, transferred through the signal path in the operation cycle, to obtain a second result and outputs the second result onto the signal path during an idle cycle in which no data is transferred through the signal path. And the comparator compares the second result, transferred through the signal path in the idle cycle, to the first result and outputs a comparison result.

The second inventive processor performs an arithmetic operation based on the value of data on a signal path in an operation cycle, and transfers a result of the operation to the first device and compares the result to another operation result in an idle cycle. Accordingly, a data change caused by extraneous noise can be detected without taking any time for error detection.

A third inventive data processor includes: first, second and third devices that are coupled together via a signal path having a number of sections; and the same number of drivers for driving the respective sections of the signal path. The third device is connected to one of the sections that are located between the sections to which the first and second devices are respectively connected. The first device includes a first arithmetic unit. The first arithmetic unit performs an arithmetic operation on data to obtain a first result during an operation cycle in which the first device transfers the data to the second device through the signal path. The first arithmetic unit outputs the first result onto the signal path during an idle cycle in which no data is transferred through the signal path. The second device includes a second arithmetic unit and a sequencer. The second arithmetic unit performs the same type of arithmetic operation on the data, transferred through the signal path in the operation cycle, to obtain a second result. The third device includes a third arithmetic unit. The third arithmetic unit also performs the same type of arithmetic operation on the data, transferred through the signal path in the operation cycle, obtains a third result and then outputs the third result to the sequencer. The sequencer compares the first, second and third results to each other in the idle cycle. Also, the sequencer selectively increases the drivability of one of the drivers that drives either the section connected to the third device if the first result, transferred through the signal path, is different from the third result or the section connected to the second device if the second and third results are different from each other.

The third inventive processor can locate a specific signal path section in which data being transferred is affected by extraneous noise, and selectively increases the drivability of the driver associated with the section in question. In this manner, the processor can have its noise immunity improved without increasing the power dissipation too much.

In one embodiment of the present invention, the first and third devices may be memory devices and the second device may be a microcontroller. In such an embodiment, the processor exhibits improved noise immunity in transferring data from one of the memory devices to the microcontroller.

DESCRIPTION OF THE PREFERRED EMBODIMENTS

Hereinafter, preferred embodiments of the present invention will be described with reference to the accompanying drawings.

Embodiment 1

Figure 1:
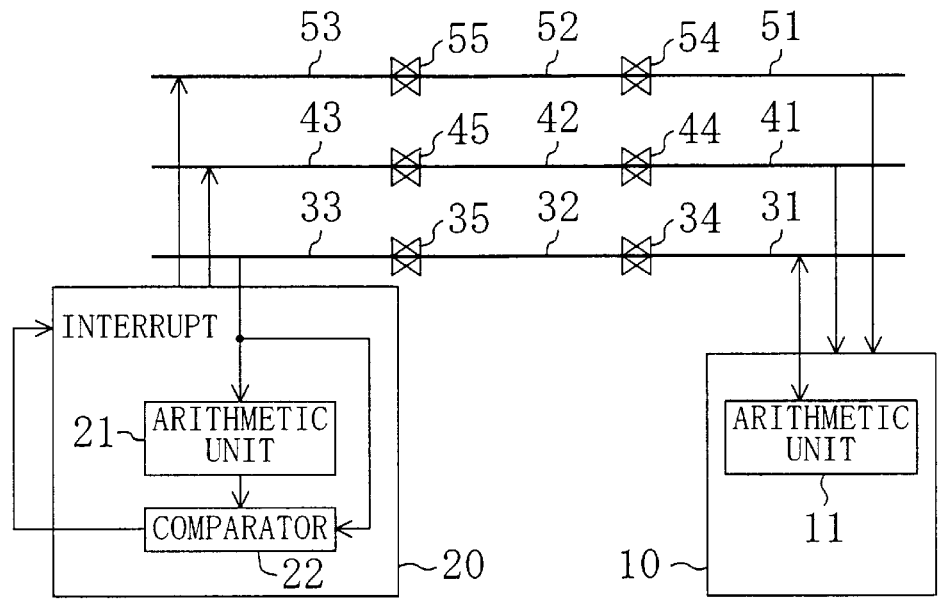
FIG. 1 is a block diagram illustrating an arrangement for a data processor according to a first embodiment of the present invention.

FIG. 1 illustrates an arrangement for a data processor according to a first embodiment of the present invention. As shown in FIG. 1, the processor includes memory 10, microcontroller 20, data buses 31 through 33, control buses 41 through 43, address buses 51 through 53 and bus switches 34, 35, 44, 45, 54 and 55. The memory 10 is an exemplary first device, or memory device, while the microcontroller 20 is an exemplary second device as defined in the claims. The data buses 31 through 33 together functions as a signal path and the bus switches 34, 35, 44, 45, 54 and 55 function as respective drivers as also defined in the claims. As shown in FIG. 1, the memory 10 includes an arithmetic unit 11, while the microcontroller 20 includes an arithmetic unit 21 and a comparator 22.

As also shown in FIG. 1, the data buses 31 and 32 are coupled together via the bus switch 34, while the data buses 32 and 33 are coupled together via the bus switch 35. The control buses 41 and 42 are coupled together via the bus switch 44, while the control buses 42 and 43 are coupled together via the bus switch 45. The address buses 51 and 52 are coupled together via the bus switch 54, while the address buses 52 and 53 are coupled together via the bus switch 55. The bus switches 34, 35, 44, 45, 54 and 55 drive the respective buses appropriately in accordance with the direction in which a signal is transmitted.

As also shown in FIG. 1, the arithmetic units 11 and 21 are connected to the data buses 31 and 33, respectively. The memory 10 is connected to the control and address buses 41 and 51, while the microcontroller 20 is connected to the control and address buses 43 and 53. The comparator 22 compares the output of the arithmetic unit 21 to the value on the data bus 33. If these do not agree with each other, the comparator 22 outputs an interrupt signal to the microcontroller 20.

Figure 2:
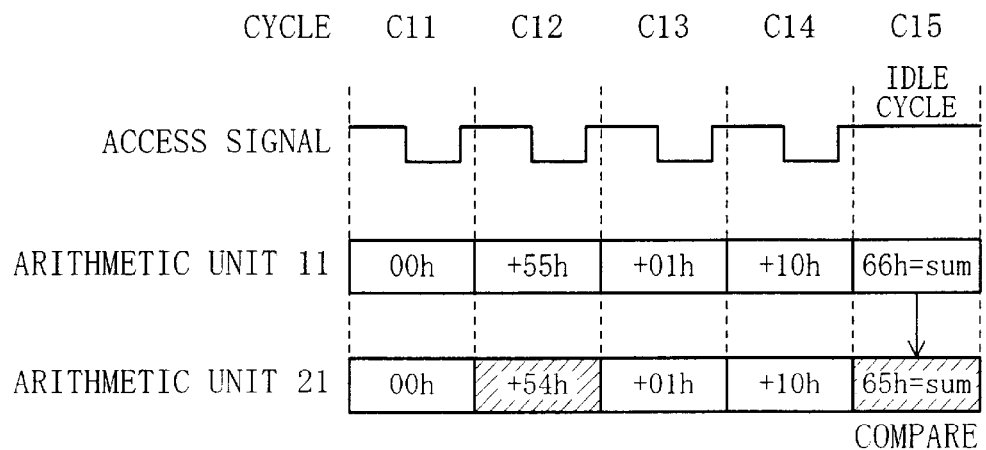
FIG. 2 is a timing diagram illustrating how the processor shown in FIG. 1 transfers data.

FIG. 2 illustrates how the processor shown in FIG. 1 transfers data. Hereinafter, it will be described with reference to FIGS. 1 and 2 how and when data is transferred from the memory 10 to the microcontroller 20.

The access signal shown in FIG. 2 is transmitted through one of the signal lines included in the control buses 41 through 43. In an operation cycle (including Cycles C11 through C14 in the example shown in FIG. 2) in which data is transferred through the data buses 31 through 33, the level of the access signal is changeable. On the other hand, in an idle cycle (e.g., Cycle C15 in the example shown in FIG. 2) in which no data is transferred through the data buses 31 through 33, the access signal shows no level transitions. The access signal may be a read or write enable signal being transmitted through the control buses 41 through 43.

In Cycle C11, the arithmetic units 11 and 21 are both initialized and store the same value "00h" thereon.

In Cycle C12, the microcontroller 20 reads out a program from the memory 10 to execute it. For that purpose, the microcontroller 20 instructs the memory 10 to output the data requested by supplying address and control signals thereto through the address buses 51 through 53 and control buses 41 through 43. In response, the memory 10 outputs data "55h", which is the program that has been stored thereon, onto the data bus 31, and the data "55h" is then transferred to the microcontroller 20 by way of the data buses 32 and 33. On receiving the data, the microcontroller 20 decodes the data to execute the program.

Suppose the data "55h" unintentionally changes into different data "54h" due to extraneous noise while the data "55h" is being transmitted through the data bus 32. In that case, the microcontroller 20 decodes the erroneous data "54h" to execute the program.

In the meantime, the arithmetic unit 11 adds the data "55h", which the memory 10 has output onto the data bus 31, to the stored value "00h" to obtain a sum "55h" and then stores the value "55h" thereon. On the other hand, the arithmetic unit 21 adds the data "54h", which the microcontroller 20 has received through the data bus 33, to the stored value "00h" to obtain a sum "54h" and then stores the value "54h" thereon.

In Cycle C13, the microcontroller 20 again reads out a program from the memory 10 to execute it. The memory 10 outputs data "01h", which is the program that has been stored thereon, onto the data bus 31, and then the data "01h" is transferred to the microcontroller 20 by way of the data buses 32 and 33. On receiving the data "01h", the microcontroller 20 decodes the data "01h" to execute the program.

In the meantime, the arithmetic unit 11 adds the data "01h", which the memory 10 has output onto the data bus 31, to the stored value "55h" to obtain a sum "56h" and then stores the value "56h" thereon. On the other hand, the arithmetic unit 21 adds the data "01h", which the microcontroller 20 has received through the data bus 33, to the stored value "54h" to obtain a sum "55h" and then stores the value "55h" thereon.

In Cycle C14, the microcontroller 20 once more reads out a program from the memory 10 to execute it. The memory 10 outputs data "10h", which is the program that has been stored thereon, onto the data bus 31, and then the data "10h" is transferred to the microcontroller 20 by way of the data buses 32 and 33. On receiving the data "10h", the microcontroller 20 decodes the data "10h" to execute the program.

In the meantime, the arithmetic unit 11 adds the data "10h", which the memory 10 has output onto the data bus 31, to the stored value "56h" to obtain a sum "66h" and then stores the value "66h" thereon. On the other hand, the arithmetic unit 21 adds the data "10h", which the microcontroller 20 has received through the data bus 33, to the stored value "55h" to obtain a sum "65h" and then stores the value "65h" thereon.

The next cycle C15 is an idle cycle. The arithmetic unit 11 in the memory 10, which has been outputting data several times, finds out that it is an idle cycle now because there is no level change in the access signal. So the arithmetic unit 11 outputs its stored value "66h" onto the data bus 31. This data "66h" is transferred through the data buses 32 and 33 to the comparator 22 in the microcontroller 20. A bus controller (not shown) included in the microcontroller 20 notifies the arithmetic unit 21 and comparator 22 that the current cycle C15 is an idle cycle. In response, the arithmetic unit 21 outputs its stored value "65h" to the comparator 22. And the comparator 22 compares the value "66h" output from the arithmetic unit 11 to the value "65h" output from the arithmetic unit 21 to find that these values do not agree with each other. Accordingly, the comparator 22 outputs an inequality signal as an interrupt signal to the microcontroller 20. On the other hand, if the values compared are agree with each other, the comparator 22 finds that the data has been transferred correctly. So the comparator 22 outputs no inequality signal in that case.

Responsive to the interrupt signal, the microcontroller 20 performs interrupt processing to initialize the internal state of the microcontroller 20 entirely by means of software, or by using a pre-installed program. In this case, the arithmetic units 11 and 21 are also initialized.

Alternatively, the inequality signal may also be output as a reset signal to the microcontroller 20. In that case, the overall hardware of the microcontroller 20 is initialized.

Furthermore, after the interrupt processing is over, a time it takes to access the memory 10 may be increased by adding a wait time to the access time for the data bus 33 so that the effects of noise can be reduced.

In the foregoing illustrative embodiment, the arithmetic units 11 and 21 both perform addition. Alternatively, these units 11 and 21 may carry out any other type of arithmetic operation such as subtraction or multiplication so long as these units 11 and 21 perform the same type of operations.

Figure 3:
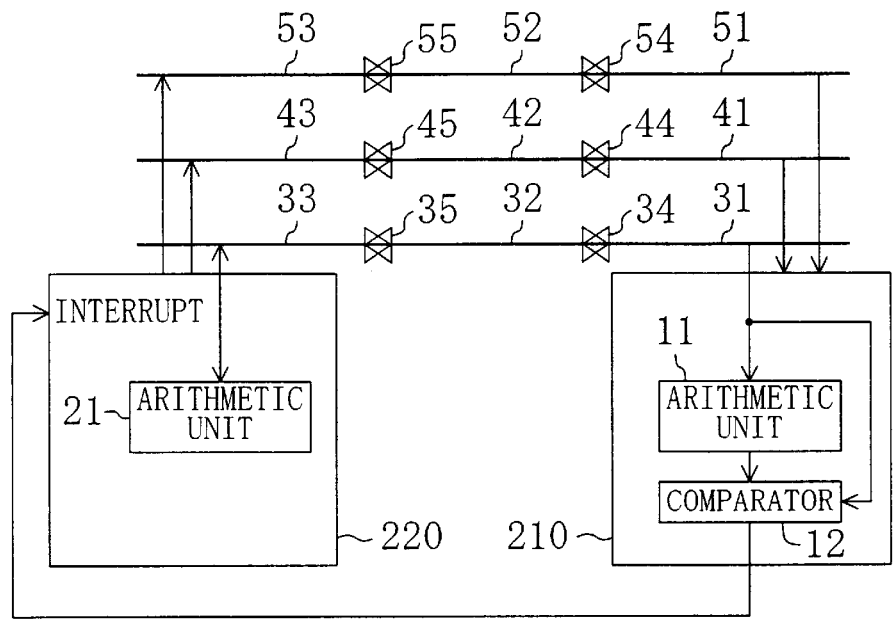
FIG. 3 is a block diagram illustrating an arrangement for another data processor according to the first embodiment.

FIG. 3 is a block diagram illustrating an arrangement for another data processor according to the first embodiment. In the data processor shown in FIG. 3, a comparator is provided for a memory, not for a microcontroller. That is to say, the data processor shown in FIG. 3 includes: a memory 210 including an arithmetic unit 11 and a comparator 12; and a microcontroller 220 including an arithmetic unit 21 instead of the memory 10 and microcontroller 20 shown in FIG. 1.

Specifically, the value stored on the arithmetic unit 21 is transferred to the comparator 12 by way of the data buses 31 through 33 in an idle cycle. Then, the comparator 12 compares the values that have been stored on the arithmetic units 21 and 11 to each other. And if these values do not agree with each other, the comparator 12 outputs an inequality signal as an interrupt signal to the microcontroller 220. In the other respects, the data processor shown in FIG. 3 operates in the same way as the counterpart shown in FIG. 1.

As described above, according to this embodiment, the microcontroller 20 once performs an erroneous program in Cycle C12, but is initialized in Cycle 15 (i.e., the erroneous program is aborted). Accordingly, it is possible to prevent the microcontroller 20 from causing a runaway or being hung up.

Figure 4:
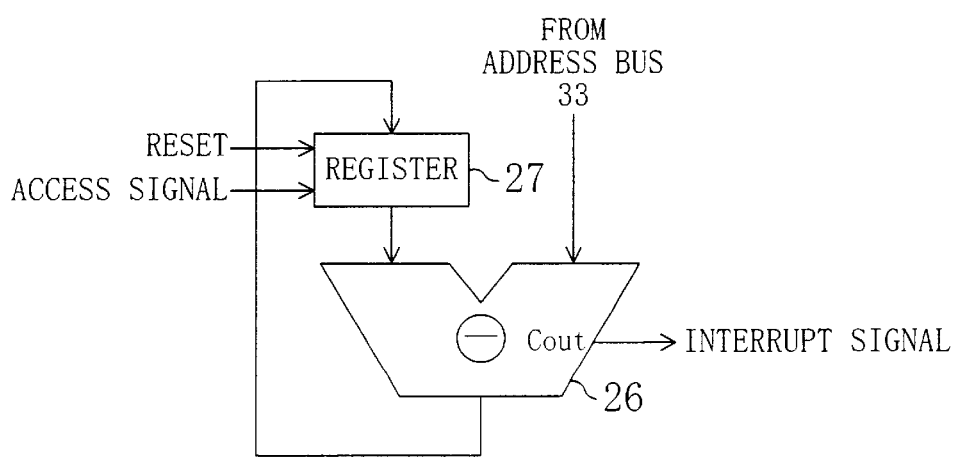
FIG. 4 illustrates an exemplary circuit functioning as the arithmetic unit and comparator shown in FIG. 1.

FIG. 4 illustrates an exemplary circuit functioning as the arithmetic unit 21 and comparator 22 shown in FIG. 1. As shown in FIG. 4, the circuit includes a subtractor 26 and a register 27. The subtractor 26 subtracts a value input through the address bus 33 from the output value of the register 27, and then outputs the remainder to the register 27. In this case, the arithmetic unit 11 of the memory 10 should perform subtraction. Responsive to the access signal, the register 27 updates its output.

Hereinafter, it will be described how the processor, including the register 27 and subtractor 26 shown in FIG. 4, operates where the same data as that shown in FIG. 2 is transferred through the data buses 31 through 33.

In Cycle C11, the arithmetic unit 11 and register 27 are both initialized and store the same value "00h" thereon.

In Cycle C12, the arithmetic unit 11 subtracts the data "55h", which the memory 10 has output onto the data bus 31, from the stored value "00h" to obtain a remainder "−55h" and then stores the value "−55h" thereon. On the other hand, the subtractor 26 subtracts the data "54h", which the microcontroller 20 has received through the data bus 33, from the value "00h" stored on the register 27 to obtain a remainder "−54h" and then outputs the value "−54h" to the register 27. In response, the register 27 stores the value "−54h" thereon.

In Cycle C13, the arithmetic unit 11 subtracts the data "01h", which the memory 10 has output onto the data bus 31, from the stored value "−55h" to obtain a remainder "−56h" and then stores the value "−56h" thereon. On the other hand, the subtractor 26 subtracts the data "01h", which the microcontroller 20 has received through the data bus 33, from the value "−54h" stored on the register 27 to obtain a remainder "−55h" and then outputs the value "−55h" to the register 27. In response, the register 27 stores the value "−55h" thereon.

In Cycle C14, the arithmetic unit 11 subtracts the data "10h" from the stored value "−56h", thereby obtaining a remainder "−66h" and then storing the value "−66h" thereon. On the other hand, the subtractor 26 subtracts the data "10h" from the value "−55h" stored on the register 27 to obtain a remainder "−65h" and then outputs the value "−65h" to the register 27. In response, the register 27 stores the value "−65h" thereon.

The next cycle C15 is an idle cycle. The arithmetic unit 11 finds out that it is an idle cycle now and outputs its stored value "−66h" to the subtractor 26 by way of the data bus 31. A bus controller (not shown) included in the microcontroller 20 notifies the subtractor 26 that the current cycle C15 is an idle cycle. In response, the register 27 outputs its stored value "−65h" to the subtractor 26. And the subtractor 26 subtracts the value "−66h" output from the arithmetic unit 11 from the value "−65h" output from the register 27 to find that the result does not equal zero in this idle cycle. Accordingly, the subtractor 26 outputs an inequality signal Cout as an interrupt signal to the microcontroller 20. However, if the result equals zero, the subtractor 26 finds that the data has been transferred correctly. So the subtractor 26 outputs no inequality signal in that case.

In this manner, the circuit shown in FIG. 4 realizes the functions of the arithmetic unit 21 and comparator 22 easily.

MODIFIED EXAMPLE 1 OF EMBODIMENT 1

Figure 5:
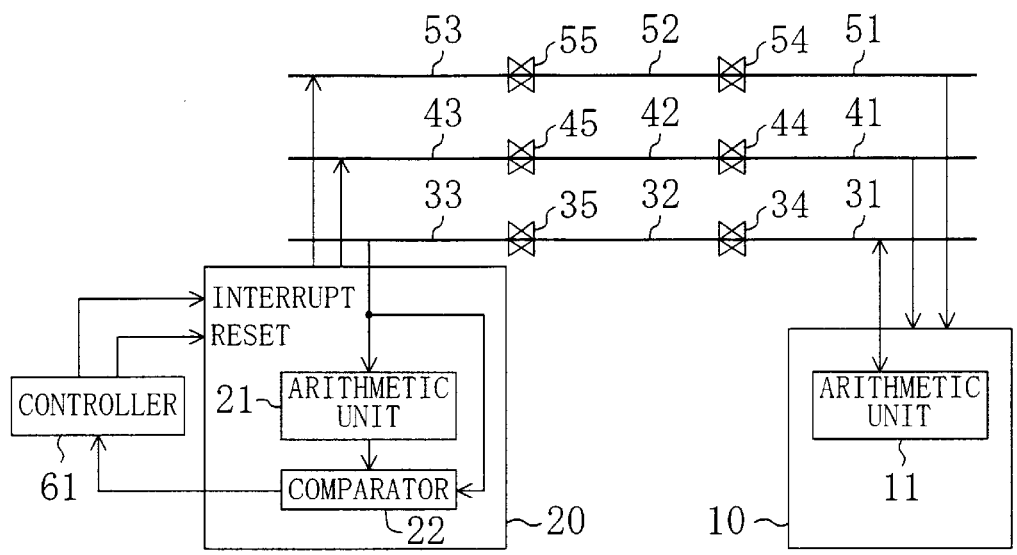
FIG. 5 is a block diagram illustrating an arrangement for a data processor according to a first modified example of the first embodiment.

FIG. 5 illustrates an arrangement for a data processor according to a first modified example of the first embodiment. The processor shown in FIG. 5 further includes a controller 61 in addition to all the components of the counterpart shown in FIG. 1. In FIG. 5, each component also shown in FIG. 1 is identified by the same reference numeral and the description thereof will be omitted herein.

Referring to FIG. 5, if the comparator 22 does not find the output values of the arithmetic units 11 and 21 equal to each other, the comparator 22 outputs an inequality signal to the controller 61. Responsive to the inequality signal, the controller 61 outputs an interrupt or reset signal to the microcontroller 20 depending on the number of times that the inequality signal has been input thereto. For example, before the number of times reaches three, the controller 61 may output an interrupt signal to the microcontroller 20. And when the inequality signal is input for the third time, the controller 61 may output a reset signal thereto.

Responsive to the interrupt signal, the microcontroller 20 performs interrupt processing to initialize the internal state of the microcontroller 20 entirely by means of software, or by using a pre-installed program. On the other hand, when the reset signal is input thereto, the microcontroller 20 performs reset processing to initialize its own hardware.

Figure 6:
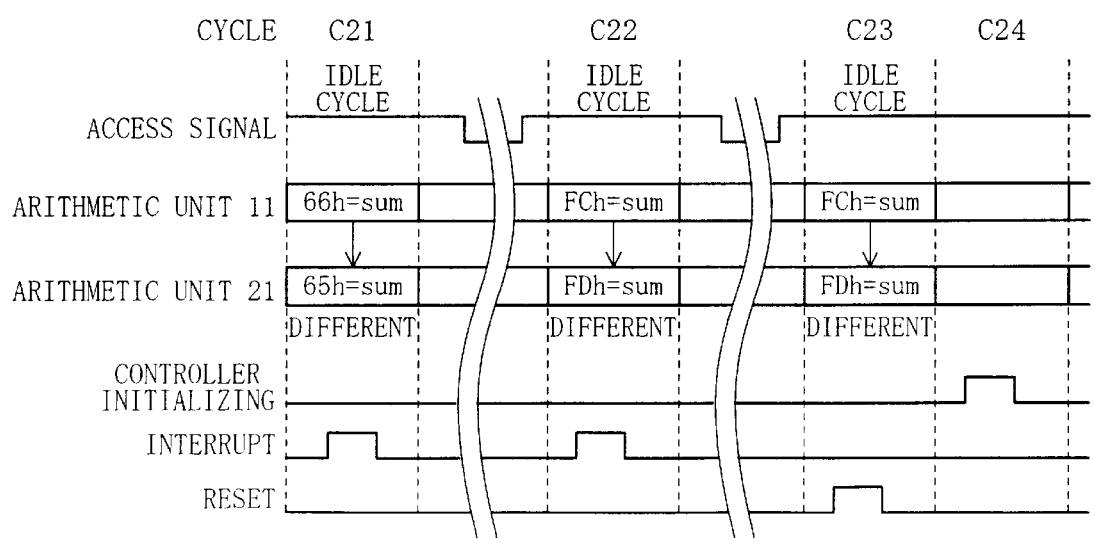
FIG. 6 is a timing diagram illustrating when the controller of the processor shown in FIG. 5 outputs an interrupt or reset signal.

FIG. 6 illustrates when the controller 61 of the processor shown in FIG. 5 outputs an interrupt or reset signal. As shown in FIG. 6, Cycles C21, C22 and C23 are all idle cycles. The other non-idle cycles intervening between them are not illustrated in FIG. 6. Suppose the controller 61 is in its initial state.

In Cycle C21, the arithmetic units 11 and 21 output their sums "66h" and "65h", respectively. The comparator 22 finds inequality between these values, and outputs an inequality signal to the controller 61. Since this is the first inequality signal input, the controller 61 outputs an interrupt signal to the microcontroller 20. In response, the microcontroller 20 performs interrupt processing to initialize itself by means of software. At this time, the arithmetic units 11 and 21 are also initialized.

In Cycle C22 posterior to Cycle C21, the arithmetic units 11 and 21 output "FCh" and "FDh" as their respective sums. The comparator 22 finds inequality between these values, and outputs an inequality signal to the controller 61. Since this is the second inequality signal input, the controller 61 outputs an interrupt signal to the microcontroller 20. In response, the microcontroller 20 performs the interrupt processing again to initialize itself by means of software. At this time, the arithmetic units 11 and 21 are also initialized.

In Cycle C23 posterior to Cycle C22, the arithmetic units 11 and 21 output "FCh" and "FDh" as their respective sums. The comparator 22 finds inequality between these values, and outputs an inequality signal to the controller 61. Since this is the third inequality signal input, the controller 61 outputs a reset signal to the microcontroller 20. In response, the microcontroller 20 performs reset processing to initialize itself by means of hardware. At this time, the arithmetic units 11 and 21 are also initialized.

In the next cycle C24 after the reset processing is over, the controller 61 is initialized. When another inequality signal is input thereto next time, the controller 61 will output an interrupt signal.

Figure 7:
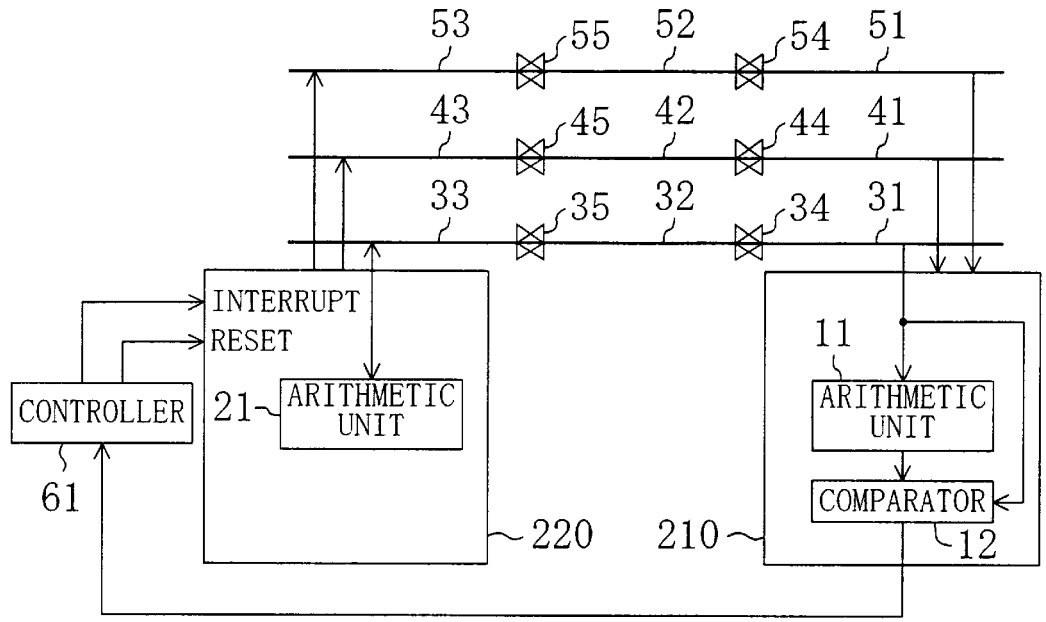
FIG. 7 is a block diagram illustrating an arrangement for another data processor according to the first modified example of the first embodiment.

FIG. 7 is a block diagram illustrating an arrangement for another data processor according to the first modified example of the first embodiment. In the data processor shown in FIG. 7, the comparator 12 is provided for the memory 210, not for the microcontroller 220, as in the data processor shown in FIG. 3.

Specifically, the value stored on the arithmetic unit 21 is transferred to the comparator 12 by way of the data buses 31 through 33 in an idle cycle. Then, the comparator 12 compares the values that have been stored on the arithmetic units 21 and 11 to each other. And if these values do not agree with each other, the comparator 12 outputs an inequality signal to the controller 61. In the other respects, the data processor shown in FIG. 7 operates in the same way as the counterpart shown in FIG. 5.

As can be seen, if the processor is affected by noise too many times to avoid its effects just by using a software program, the overall hardware of the microcontroller 20 is reset according to this modified example. Thus, the processor of this modified example can perform the intended program correctly after that.

MODIFIED EXAMPLE 2 OF EMBODIMENT 1

Figure 8:
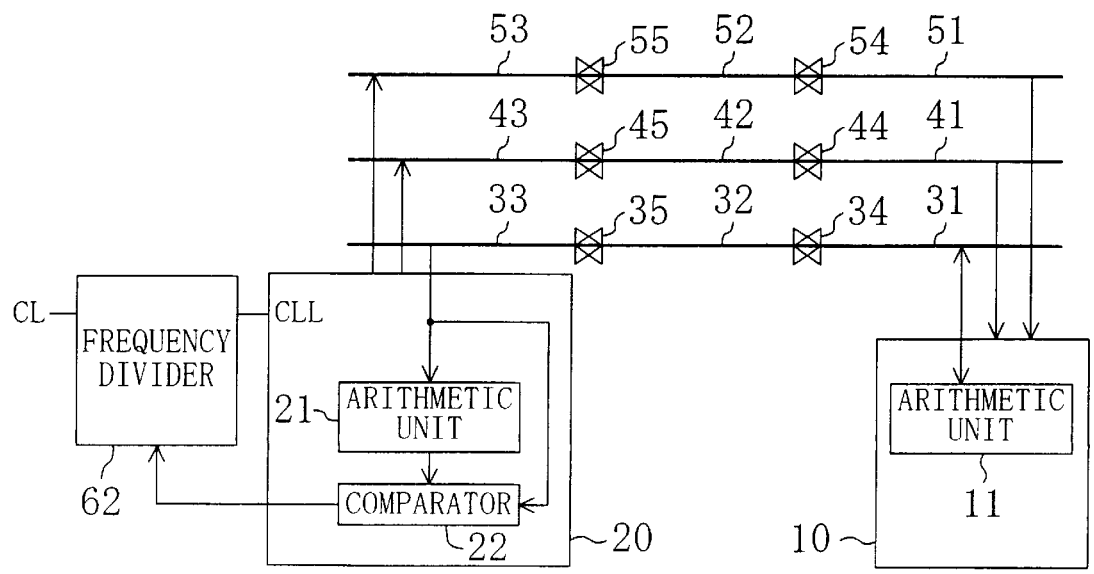
FIG. 8 is a block diagram illustrating an arrangement for a data processor according to a second modified example of the first embodiment.

FIG. 8 illustrates an arrangement for a data processor according to a second modified example of the first embodiment. The processor shown in FIG. 8 further includes a frequency divider 62 in addition to all the components of the counterpart shown in FIG. 1. In FIG. 8, each component also shown in FIG. 1 is identified by the same reference numeral and the description thereof will be omitted herein.

Referring to FIG. 8, the frequency divider 62 outputs a clock signal CLL to the microcontroller 20. The frequency of the clock signal CLL is a submultiple of that of a reference clock CL. If the comparator 22 does not find the output values of the arithmetic units 11 and 21 equal to each other, the comparator 22 outputs an inequality signal to the frequency divider 62. Responsive to the inequality signal, the frequency divider 62 changes the frequency of the clock signal CLL depending on the number of times that the inequality signal has been input thereto. For example, in the initial state, the frequency divider 62 may output a clock signal CLL with a frequency one-eighth as high as the reference clock frequency. When the inequality signal is input for the first time, the frequency divider 62 may divide the reference clock frequency by nine. And when the inequality signal comes for the second time, the clock signal CLL may have a frequency one tenth as high as the reference clock frequency.

Figure 9:
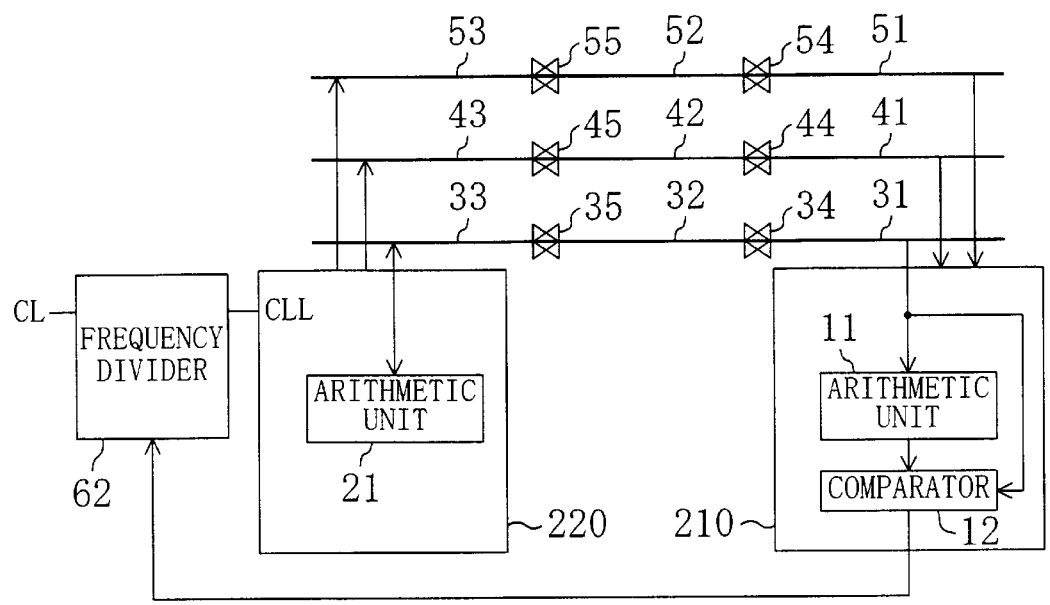
FIG. 9 is a block diagram illustrating an arrangement for another data processor according to the second modified example of the first embodiment.

FIG. 9 is a block diagram illustrating an arrangement for another data processor according to the second modified example of the first embodiment. In the data processor shown in FIG. 9, the comparator 12 is provided for the memory 210, not for the microcontroller 220, as in the data processor shown in FIG. 3.

Specifically, the value stored on the arithmetic unit 21 is transferred to the comparator 12 by way of the data buses 31 through 33 in an idle cycle. Then, the comparator 12 compares the values that have been stored on the arithmetic units 21 and 11 to each other. And if these values do not agree with each other, the comparator 12 outputs an inequality signal to the frequency divider 62. In the other respects, the data processor shown in FIG. 9 operates in the same way as the counterpart shown in FIG. 8.

In this modified example, every time the inequality signal is output, the clock signal CLL decreases its frequency and the operating speed of the microcontroller 20 also decreases. Accordingly, the level of noise, resulting from unwanted radiation created inside the microcontroller 20, can be lowered gradually and the processor can have its noise immunity increased little by little.

Embodiment 2

Figure 10:
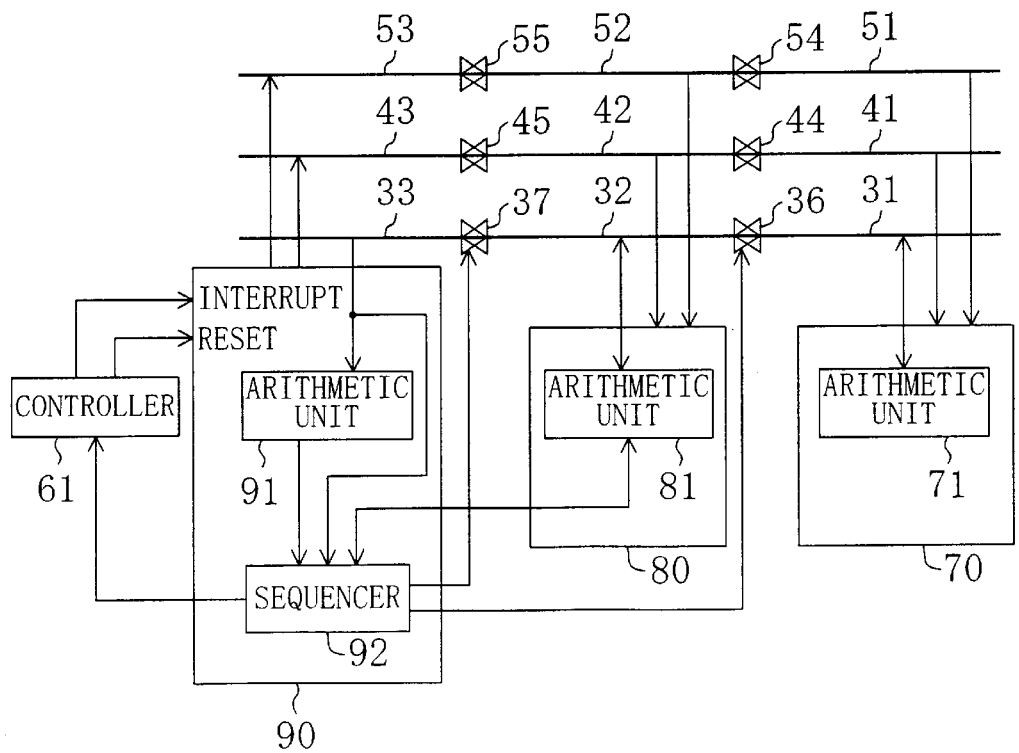
FIG. 10 is a block diagram illustrating an arrangement for a data processor according to a second embodiment of the present invention.

FIG. 10 illustrates an arrangement for a data processor according to a second embodiment of the present invention. As shown in FIG. 10, the processor includes memories 70 and 80, microcontroller 90, controller 61, data buses 31 through 33, control buses 41 through 43, address buses 51 through 53 and bus switches 36, 37, 44, 45, 54 and 55. The memories 70 and 80 are exemplary memory devices, or first and third devices, while the microcontroller 90 is an exemplary second device as defined in the claims. The data buses 31 through 33 together functions as a signal path, while the bus switches 36, 37, 44, 45, 54 and 55 function as respective drivers as also defined in the claims. The memory 70 includes an arithmetic unit 71, the memory 80 includes an arithmetic unit 81, and the microcontroller 90 includes an arithmetic unit 91 and a sequencer 92.

As shown in FIG. 10, the data buses 31 and 32 are coupled together via the bus switch 36, while the data buses 32 and 33 are coupled together via the bus switch 37. The bus switches 36 and 37 can change a signal transmission direction and drivability depending on the necessity.

As also shown in FIG. 10, the arithmetic units 71, 81 and 91 are connected to the data buses 31, 32 and 33, respectively. The memory 70 is connected to the control and address buses 41 and 51, the memory 80 is connected to the control and address buses 42 and 52, and the microcontroller 90 is connected to the control and address buses 43 and 53. The sequencer 92 receives the outputs of the arithmetic units 81 and 91 and the value on the data bus 33, and compares these values to each other. Based on a result of comparison, the sequencer 92 controls the drivability of the bus switches 36 and 37. And if the sequencer 92 finds these values different from each other, then the sequencer 92 outputs an inequality signal to the controller 61.

The bus switches 44, 45, 54 and 55 and controller 61 are the same as the counterparts of the data processor shown in FIG. 5, and the description thereof will be omitted herein.

Figure 11:
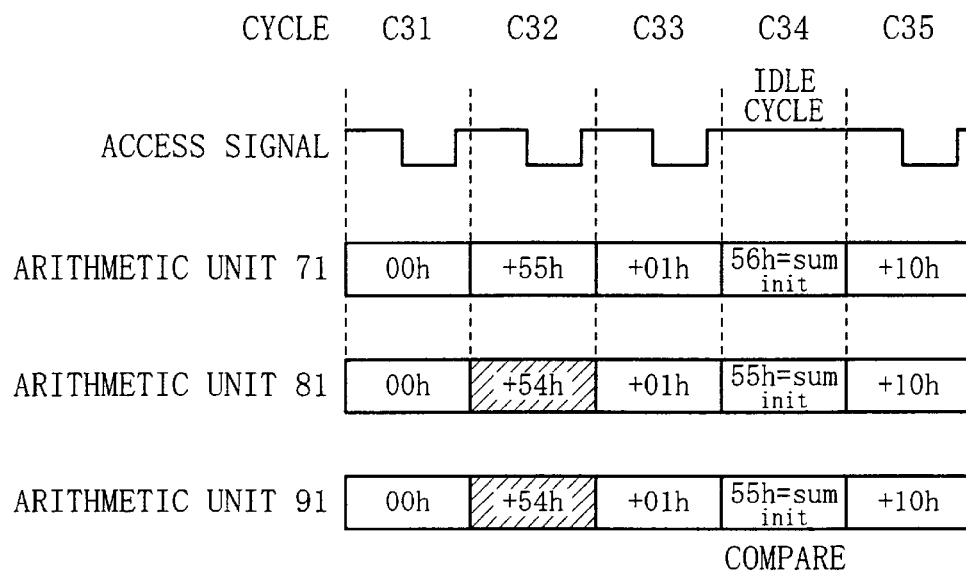
FIG. 11 is a timing diagram illustrating how the processor shown in FIG. 10 transfers data.
Figure 12:
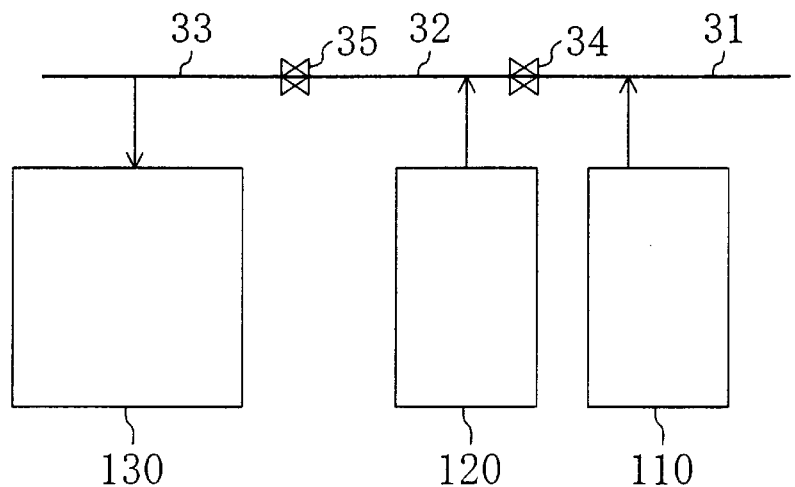
FIG. 12 is a block diagram illustrating an arrangement for a known data processor.

FIG. 11 illustrates how the processor shown in FIG. 10 transfers data. Hereinafter, it will be described with reference to FIGS. 10 and 11 how and when data is transferred from the memory 70 to the microcontroller 90. As shown in FIG. 11, Cycles C31 through C33 are operation cycles and Cycle C34 is an idle cycle.

In Cycle C31, the arithmetic units 71, 81 and 91 are initialized and store the same value "00h" thereon.

In Cycle C32, the microcontroller 90 reads out a program from the memory 70 to execute it. For that purpose, the microcontroller 90 instructs the memory 70 to output the data requested by supplying address and control signals thereto through the address buses 51 through 53 and control buses 41 through 43. In response, the memory 70 outputs data "55h", which is the program that has been stored thereon, onto the data bus 31, and then the data "55h" is transferred to the microcontroller 90 by way of the data buses 32 and 33. On receiving this data, the microcontroller 90 decodes it to execute the program.

Suppose the data "55h" unintentionally changes into different data "54h" due to extraneous noise while transmitted through the data bus 32. In that case, the microcontroller 90 decodes the erroneous data "54h" to execute the program.

In the meantime, the arithmetic unit 71 adds the data "55h", which the memory 70 has output onto the data bus 31, to the stored value "00h" to obtain a sum "55h" and then stores the value "55h" thereon. The arithmetic unit 81 adds the data "54h", which has been received through the data bus 32, to the stored value "00h" to obtain a sum "54h" and then stores the value "54h" thereon. And the arithmetic unit 91 adds the data "54h", which the microcontroller 90 has received through the data bus 33, to the stored value "00h" to obtain a sum "54h" and then stores the value "54h" thereon.

In Cycle C33, the microcontroller 90 again reads out a program from the memory 70 to execute it. The memory 70 outputs data "01h", which is the program that has been stored thereon, onto the data bus 31, and then the data "01h" is transferred to the microcontroller 90 through the data buses 32 and 33. On receiving the data "01h", the microcontroller 90 decodes it to execute the program.

In the meantime, the arithmetic unit 71 adds the data "01h", which the memory 70 has output onto the data bus 31, to the stored value "55h" to obtain a sum "56h" and then stores the value "56h" thereon. The arithmetic unit 81 adds the data "01h", which has been received through the data bus 32, to the stored value "54h" to obtain a sum "55h" and then stores the value "55h" thereon. And the arithmetic unit 91 adds the data "01h", which the microcontroller 90 has received through the data bus 33, to the stored value "54h" to obtain a sum "55h" and then stores the value "55h" thereon.

The next cycle C34 is an idle cycle. The arithmetic unit 71 in the memory 70, which has been outputting data several times, finds out that it is an idle cycle now because there is no level change in the access signal. So the arithmetic unit 71 outputs its stored value "56h" onto the data bus 31. This data "56h" is transferred through the data buses 32 and 33 to the sequencer 92 in the microcontroller 90. A bus controller (not shown) included in the microcontroller 90 notifies the arithmetic units 81 and 91 and sequencer 92 that the current cycle C15 is an idle cycle. In response, the arithmetic units 81 and 91 output their stored value "55h" to the sequencer 92.

The sequencer 92 compares the respective sums, output by the three arithmetic units 71, 81 and 91, to each other to find exactly at which data bus the data changed. The sequencer 92 includes a register that stores the drivability values of the respective bus switches thereon. Accordingly, the sequencer 92 increments the register value of one of the switches that drives the data bus where the data changed. In the illustrated embodiment, the greater a register value stored for the bus switch 36 or 37 in the sequencer 92, the greater the drivability of the switch 36 or 37 can be.

First, the sequencer 92 compares the value "56h" output from the arithmetic unit 71 to the value "55h" output from the arithmetic unit 91 to find inequality between these values. Based on this result, the sequencer 92 estimates that the data changed on the data bus 32 or 33 due to extraneous noise.

Next, the sequencer 92 compares the value "55h" output from the arithmetic unit 81 to the value "55h" output from the arithmetic unit 91 to find these values equal to each other. Based on this result, the sequencer 92 estimates that there was no data change on the data bus 33.

That is to say, since the result obtained by the arithmetic unit 71 is different from that obtained by the arithmetic unit 81, it can be seen that the data changed due to extraneous noise on the data bus 32. Accordingly, the sequencer 92 increases the drivability of the bus switch 36 that should drive the data bus 32. The sequencer 92 also initializes the arithmetic units 71, 81 and 91.

In this manner, the data processor of this embodiment can selectively increase the drivability of only the bus switch 36 that drives the data bus 32 affected by noise. In other words, there is no need to increase the drivability values of all the bus switches according to this embodiment. Thus, the data processor can have its noise immunity improved without increasing its power dissipation too much.

If the result obtained by the arithmetic unit 81 is different from that obtained by the arithmetic unit 91, then it is found that the data changed due to noise on the data bus 33. In that case, the sequencer 92 increases the drivability of only the bus switch 37 that should drives the data bus 33.

The same statement is equally applicable to a situation where the data bus 32 has been divided into multiple subsections and the memory 80 is connected to one of those subsections.

In the foregoing illustrative embodiments of the present invention, the first and second devices are memory and microcontroller, respectively. However, the first or second device may be any other type of device so long as data can be exchanged between them by way of a signal path. For example, a timer or a serial interface may be used as the first or second device.

As is apparent from the foregoing description, even if the inventive data processor once operates erroneously due to extraneous noise, the processor can resume running normally without using any special purpose unit for monitoring data on the signal path or sacrificing the data processing rate.

What is claimed is:

1. A data processor comprising first and second devices that are coupled together via a signal path, wherein the first device includes a first arithmetic unit, the first arithmetic unit performing an arithmetic operation on data to obtain a first result during an operation cycle, in which the first device transfers the data to the second device through the signal path, the first arithmetic unit outputting the first result onto the signal path during an idle cycle in which no data is transferred through the signal path, and wherein the second device includes:
      a second arithmetic unit, which performs an arithmetic operation on the data, transferred through the signal path in the operation cycle, to obtain a second result, the first and second arithmetic units performing the same type of arithmetic operations; and
      a comparator for comparing the first result, transferred through the signal path in the idle cycle, to the second result and outputs a comparison result,
      wherein if the comparison result indicates inequality between the first and second results, the comparator initializes the second device by performing interrupt or reset processing.

2. A data processor comprising first and second devices that are coupled together via a signal path, wherein the first device includes a first arithmetic unit, the first arithmetic unit performing an arithmetic operation on data to obtain a first result during an operation cycle, in which the first device transfers the data to the second device through the signal path, the first arithmetic unit outputting the first result onto the signal path during an idle cycle in which no data is transferred through the signal path, and wherein the second device includes:
      a second arithmetic unit, which performs an arithmetic operation on the data, transferred through the signal path in the operation cycle, to obtain a second result, the first and second arithmetic units performing the same type of arithmetic operations; and
      a comparator for comparing the first result, transferred through the signal path in the idle cycle, to the second result and outputs a comparison result; and
   said data processor further comprising a controller, which counts the number of times of inequality between the first and second results and outputs an interrupt signal to the second device if the number is equal to or smaller than a predetermined number or a reset signal to the second device if the number is greater than the predetermined number.

3. A data processor comprising first and second devices that are coupled together via a signal path, wherein the first device includes a first arithmetic unit, the first arithmetic unit performing an arithmetic operation on data to obtain a first result during an operation cycle, in which the first device transfers the data to the second device through the signal path, the first arithmetic unit outputting the first result onto the signal path during an idle cycle in which no data is transferred through the signal path, and wherein the second device includes:
      a second arithmetic unit, which performs an arithmetic operation on the data, transferred through the signal path in the operation cycle, to obtain a second result, the first and second arithmetic units performing the same type of arithmetic operations; and
      a comparator for comparing the first result, transferred through the signal path in the idle cycle, to the second result and outputs a comparison result; and
   said data processor further comprising a frequency divider, the frequency divider supplying a signal, of which the frequency is a submultiple of a clock frequency, to the second device, and decreasing the frequency of the signal if the comparison result indicates inequality between the first and second results.

4. The processor of one of claims 1 to 3, wherein the first device is a memory device and the second device is a microcontroller.

5. A data processor comprising first and second devices that are coupled together via a signal path, wherein the first device includes:
      a first arithmetic unit performing an arithmetic operation on data to obtain a first result during an operation cycle, in which the first device transfers the data to the second device through the signal path; and
      a comparator, and
   wherein the second device includes a second arithmetic unit, which performs an arithmetic operation on the data, transferred through the signal path in the operation cycle, to obtain a second result and outputs the second result onto the signal path during an idle cycle in which no data is transferred through the signal path, the first and second arithmetic units performing the same type of arithmetic operations, and
   wherein the comparator compares the second result, transferred through the signal path in the idle cycle, to the first result and outputs a comparison result, and
   wherein if the comparison result indicates inequality between the first and second results, the comparator initializes the second device by performing interrupt or reset processing.

6. A data processor comprising first and second devices that are coupled together via a signal path, wherein the first device includes:
      a first arithmetic unit performing an arithmetic operation on data to obtain a first result during an operation cycle, in which the first device transfers the data to the second device through the signal path; and
      a comparator, and
   wherein the second device includes a second arithmetic unit, which performs an arithmetic operation on the data, transferred through the signal path in the operation cycle, to obtain a second result and outputs the second result onto the signal path during an idle cycle in which no data is transferred through the signal path, the first and second arithmetic units performing the same type of arithmetic operations, and
   wherein the comparator compares the second result, transferred through the signal path in the idle cycle, to the first result and outputs a comparison result; and said data processor further comprising a controller, which counts the number of times of inequality between the first and second results and outputs an interrupt signal to the second device if the number is equal to or smaller than a predetermined number or a reset signal to the second device if the number is greater than the predetermined number.

7. A data processor comprising first and second devices that are coupled together via a signal path, wherein the first device includes:
- a first arithmetic unit performing an arithmetic operation on data to obtain a first result during an operation cycle, in which the first device transfers the data to the second device through the signal path; and
- a comparator, and wherein the second device includes a second arithmetic unit, which performs an arithmetic operation on the data, transferred through the signal path in the operation cycle, to obtain a second result and outputs the second result onto the signal path during an idle cycle in which no data is transferred through the signal path, the first and second arithmetic units performing the same type of arithmetic operations, and wherein the comparator compares the second result, transferred through the signal path in the idle cycle, to the first result and outputs a comparison result; and said data processor further comprising a frequency divider, the frequency divider supplying a signal, of which the frequency is a submultiple of a clock frequency, to the second device, and decreasing the frequency of the signal if the comparison result indicates inequality between the first and second results.

8. The processor of one of claims 5 to 7, wherein the first device is a memory device and the second device is a microcontroller.

9. A data processor comprising:

first, second and third devices that are coupled together via a signal path having a number of sections; and the same number of drivers for driving the respective sections of the signal path, wherein the third device is connected to one of the sections that are located between the sections to which the first and second devices are respectively connected, wherein the first device includes a first arithmetic unit, the first arithmetic unit performing an arithmetic operation on data to obtain a first result during an operation cycle, in which the first device transfers the data to the second device through the signal path, the first arithmetic unit outputting the first result onto the signal path during an idle cycle in which no data is transferred through the signal path, and wherein the second device includes:
- a second arithmetic unit, which performs an arithmetic operation on the data, transferred through the signal path in the operation cycle, to obtain a second result, the first and second arithmetic units performing the same type of arithmetic operations;
- and a sequencer, and wherein the third device includes a third arithmetic unit, which performs an arithmetic operation on the data, transferred through the signal path in the operation cycle, obtains a third result and then outputs the third result to the sequencer, the first and third arithmetic units performing the same type of arithmetic operations, and wherein the sequencer compares the first, second and third results to each other in the idle cycle, and selectively increases the drivability of one of the drivers that drives either the section connected to the third device if the first result, transferred through the signal path, is different from the third result or the section connected to the second device if the second and third results are different from each other.

10. The processor of claim 9, wherein the first and third devices are memory devices and the second device is a microcontroller.

\* \* \* \* \*